(12) United States Patent
Ehmann et al.

(10) Patent No.: US 11,587,702 B2
(45) Date of Patent: Feb. 21, 2023

(54) GROMMET WITH A PLURALITY OF ZONES HAVING DIFFERENT LEVELS OF ELASTICITY

(71) Applicant: ICOTEK PROJECT GMBH & CO. KG, Mogglingen (DE)

(72) Inventors: Bruno Ehmann, Mogglingen (DE); Valentin Ehmann, Schwabisch Gmund (DE)

(73) Assignee: ICOTEK PROJECT GMBH & CO. KG, Eschach (DE)

( * ) Notice: Subject to any disclaimer, the term of this patent is extended or adjusted under 35 U.S.C. 154(b) by 0 days.

(21) Appl. No.: 17/267,463

(22) PCT Filed: Jul. 24, 2019

(86) PCT No.: PCT/EP2019/069886
§ 371 (c)(1),
(2) Date: Feb. 9, 2021

(87) PCT Pub. No.: WO2020/030429
PCT Pub. Date: Feb. 13, 2020

(65) Prior Publication Data
US 2021/0313096 A1 Oct. 7, 2021

(30) Foreign Application Priority Data
Aug. 10, 2018 (DE) .......................... 102018213483.9

(51) Int. Cl.
*H01B 17/58* (2006.01)
*H02G 15/007* (2006.01)
*H02G 15/013* (2006.01)

(52) U.S. Cl.
CPC ......... *H01B 17/586* (2013.01); *H02G 15/007* (2013.01); *H02G 15/013* (2013.01)

(58) Field of Classification Search
CPC .. H01B 17/586; H02G 15/007; H02G 15/013; H02G 3/083; H02G 3/22
See application file for complete search history.

(56) References Cited

U.S. PATENT DOCUMENTS 3,053,564 A * 9/1962 Evans ........................ B60J 5/04
439/31
3,633,250 A * 1/1972 Romney ............... F16B 7/0446
403/233

(Continued)

FOREIGN PATENT DOCUMENTS

| CN | 1209912 A | 3/1999 |
| CN | 1818447 A | 8/2006 |

(Continued)

OTHER PUBLICATIONS

International Preliminary Report on Patentability received for PCT Patent Application No. PCT/EP2019/069886, dated Feb. 25, 2021, 15 pages. (7 pages of English Translation and 8 pages of Original Document).

(Continued)

*Primary Examiner* — William H. Mayo, III
*Assistant Examiner* — Rhadames Alonzo Miller
(74) *Attorney, Agent, or Firm* — Faegre Drinker Biddle & Reath LLP

(57) ABSTRACT

The invention relates to a grommet made of a material that is elastic at least in portions for receiving at least one elongate object for strain relief and sealing, comprising an outer frame element that can be opened along a slit and comprises at least two membranes that are spaced apart in the longitudinal direction of the elongate object to be received and each comprise a hole of equal size, so as to be flush with one another, for receiving the elongate object.

(Continued)

The invention is characterised in that the respective hole of the at least two membranes contacts the material of the frame element on the side of the slit.

19 Claims, 4 Drawing Sheets

(56) References Cited

U.S. PATENT DOCUMENTS

| | | | |
|---|---|---|---|
| 4,857,672 A * | 8/1989 | Rebers | G02B 6/4444 |
| | | | 174/92 |
| 4,889,298 A * | 12/1989 | Hauff | F16L 5/08 |
| | | | 174/503 |
| 5,981,877 A * | 11/1999 | Sakata | B60R 16/0222 |
| | | | 439/567 |
| 6,152,767 A * | 11/2000 | Roosen | H02G 15/013 |
| | | | 439/587 |
| 6,278,060 B1 * | 8/2001 | Mori | H02G 3/0475 |
| | | | 174/152 G |
| 6,497,414 B1 * | 12/2002 | Roosen | H02G 15/113 |
| | | | 277/316 |
| 6,660,937 B1 * | 12/2003 | MacLeod | H02G 3/22 |
| | | | 174/152 G |
| 8,704,099 B2 | 4/2014 | Agusa | |
| 2001/0008330 A1 * | 7/2001 | Sakata | B60R 16/0222 |
| | | | 277/316 |
| 2002/0038492 A1 * | 4/2002 | Hashimoto | F16L 5/10 |
| | | | 16/2.1 |
| 2002/0129958 A1 * | 9/2002 | Petri | H02G 3/088 |
| | | | 174/546 |
| 2003/0010566 A1 * | 1/2003 | Miyakawa | F02M 35/10301 |
| | | | 181/204 |
| 2003/0014924 A1 * | 1/2003 | Nakamura | B60R 13/0846 |
| | | | 52/1 |
| 2003/0015339 A1 * | 1/2003 | Sato | B60R 16/0222 |
| | | | 174/668 |
| 2004/0140118 A1 * | 7/2004 | Nishimoto | H02G 3/22 |
| | | | 174/650 |
| 2004/0154819 A1 * | 8/2004 | Sakata | B60R 16/0222 |
| | | | 174/650 |
| 2005/0140075 A1 * | 6/2005 | Mishima | F02B 77/13 |
| | | | 267/140.11 |
| 2006/0157266 A1 | 7/2006 | Mahlandt et al. | |
| 2008/0017401 A1 * | 1/2008 | Uchida | H02G 3/22 |
| | | | 174/153 G |
| 2008/0220659 A1 * | 9/2008 | Ikeya | H01R 13/5213 |
| | | | 439/701 |
| 2009/0000861 A1 * | 1/2009 | Hikami | F01N 13/102 |
| | | | 181/200 |
| 2009/0028659 A1 * | 1/2009 | Shibuya | F16B 21/073 |
| | | | 411/57.1 |
| 2009/0056230 A1 * | 3/2009 | Flendrig | B60R 16/0215 |
| | | | 49/502 |
| 2009/0065235 A1 * | 3/2009 | Uchibori | B60R 16/0222 |
| | | | 174/152 G |
| 2010/0176533 A1 * | 7/2010 | Hayashi | B29C 45/14418 |
| | | | 264/252 |
| 2010/0314158 A1 * | 12/2010 | Suzuki | H02G 3/22 |
| | | | 174/152 G |
| 2011/0073350 A1 * | 3/2011 | Okuhara | B60R 16/0222 |
| | | | 174/152 G |
| 2011/0114801 A1 | 5/2011 | Ehmann | |
| 2011/0247172 A1 * | 10/2011 | Yoshii | F16B 21/073 |
| | | | 16/2.1 |
| 2012/0193140 A1 * | 8/2012 | Briere | H02G 3/22 |
| | | | 174/650 |
| 2012/0211262 A1 * | 8/2012 | Agusa | B60R 16/0222 |
| | | | 174/152 G |
| 2012/0217041 A1 * | 8/2012 | Agusa | B60R 16/0222 |
| | | | 174/153 G |
| 2012/0252272 A1 * | 10/2012 | Omae | H01R 13/506 |
| | | | 439/607.01 |
| 2013/0008693 A1 * | 1/2013 | Okuhara | F16L 5/10 |
| | | | 174/152 G |
| 2013/0199823 A1 * | 8/2013 | Kanai | H02G 3/0468 |
| | | | 174/152 G |
| 2014/0060947 A1 * | 3/2014 | Braun | B23P 11/00 |
| | | | 16/2.2 |
| 2014/0231133 A1 * | 8/2014 | Fritz | G21C 13/06 |
| | | | 174/650 |
| 2015/0035319 A1 | 2/2015 | Fabricatore et al. | |
| 2015/0041210 A1 * | 2/2015 | Inao | B60R 16/0215 |
| | | | 174/72 A |
| 2016/0134090 A1 * | 5/2016 | Kushima | H05K 9/0098 |
| | | | 174/362 |
| 2017/0179703 A1 * | 6/2017 | Kominato | H01B 7/0045 |
| 2017/0219100 A1 * | 8/2017 | Kobayashi | F16J 15/3204 |
| 2017/0234434 A1 * | 8/2017 | Shuto | F16J 15/3232 |
| | | | 277/504 |
| 2017/0349123 A1 * | 12/2017 | Katoh | H01B 17/583 |
| 2018/0128400 A1 * | 5/2018 | Twelves | F16L 5/10 |
| 2018/0145430 A1 * | 5/2018 | Yanai | H01R 4/70 |
| 2018/0342830 A1 * | 11/2018 | Mizuno | H02G 15/013 |
| 2019/0089142 A1 * | 3/2019 | Sugino | B60R 16/0215 |

FOREIGN PATENT DOCUMENTS

| | | | |
|---|---|---|---|
| CN | 107017591 A | 8/2017 | |
| DE | 69707645 | 6/2002 | |
| DE | 10349996 | 5/2005 | |
| DE | 102009060988 | 5/2011 | |
| DE | 112010005160 | 12/2013 | |
| EP | 1498994 | 1/2005 | |
| EP | 1498994 A2 * | 1/2005 | H02G 15/013 |
| FR | 0514174 | 11/1996 | |
| FR | 2825841 | 12/2002 | |
| JP | 06-217439 A | 8/1994 | |
| JP | 2002-233035 A | 8/2002 | |
| WO | 2011/089743 A1 | 7/2011 | |

OTHER PUBLICATIONS

International Search Report and Written Opinion received for PCT Patent Application No. PCT/EP2019/069886, dated Oct. 16, 2019, 19 pages. (8 pages of English Translation and 11 pages of Original Document).

* cited by examiner

GROMMET WITH A PLURALITY OF ZONES HAVING DIFFERENT LEVELS OF ELASTICITY

CROSS-REFERENCE TO RELATED APPLICATIONS

The present application is 371 U.S. National Stage Application of International Application No. PCT/EP2019/069886, filed Jul. 24, 2019, which claims priority to DE 10 2018 213 483.9, filed Aug. 10, 2018, the disclosures of which are hereby expressly incorporated herein by reference.

BACKGROUND/SUMMARY

The disclosure relates to a grommet made of a material that is elastic at least in portions for receiving at least one elongate object, in particular a cable, for strain relief and sealing in the manner specified in greater detail in the preamble of claim 1.

Grommets of this kind which can be opened at the side via a slit in order for them to be able to receive prefabricated cables, tubes, pipes, lines or the like are generally known to have corresponding holes for receiving the elongate objects. Here, "prefabricated" means that the elongate objects are provided with add-on parts which project beyond the diameter of the elongate objects, e.g. plug connectors on cables or flanges on pipes. Purely by way of example, in this connection reference can be made to the German patent specification DE 10 2009 060 988 B3 by the applicant, which discloses grommets of this kind for strain relief in a cable-supporting unit. In addition, other grommets comprising membranes are disclosed which do not have a slit and are designed to be penetrated by cables in order to thus ensure sealing.

EP 0 514 174 A1 describes the generic prior art. This document discloses a grommet made of elastic material, which is constructed to have a slit and is designed to receive two cables. It discloses, in the longitudinal direction of the cables or, where appropriate, of other elongate objects, three successive membranes, which are designed to be relatively thin compared with the outer material of the frame element of the grommet in the longitudinal direction of the cable to be received in order for it to be possible to receive cables of different diameters, as set out in the document.

In practice, this structure with the three membranes has been found to be relatively complex to produce and relatively large in terms of its extension in the longitudinal direction of the cable to be received. Furthermore, it is the case that the sealing often cannot be ensured with sufficient quality, since the cables tend to get caught at the sides with the membranes and therefore the elastic material of the membranes completely surrounding said cables impairs the impermeability due to protrusions or bulges. This document attempts to mitigate this to a certain extent with the three consecutive membranes, but this is offset by the drawback of an extremely long installation length in the longitudinal direction of the inserted cables.

As already mentioned, the risk of the cables getting caught at the sides can be reduced by there being a larger number of membranes that each have a hole of the same size. Even if this is successful, there is still the drawback that the membrane is designed to extend around the entire cable. In order to ensure sufficient elasticity in cables of different sizes, in practice this results in a lack of strain relief and also in a lack of impermeability particularly at large cable diameters, despite the three consecutively arranged membranes, since the membrane material very easily folds over in the longitudinal direction of the cables, meaning that both the strain relief and the impermeability are negatively impacted.

The object of the present disclosure is that of providing an improved grommet which ensures very good sealing and good strain relief even at relatively substantially different diameters of the inserted elongate objects.

According to the disclosure, this object is achieved by a grommet having the features of claim 1, and in particular of the characterising part of claim 1.

The grommet itself consists of an outer frame element, which can be opened up. As in the prior art, this frame element may be made of an elastic material. In principle, it would also be conceivable for the frame element to be made of a less elastic plastics material, for example, which is held together on one side by a film hinge or a similar flexible connection element and can accordingly be opened up. The frame element is then provided with at least two membranes that are spaced apart in the longitudinal direction of the elongate object to be received and each comprise a hole of equal size, so as to be flush with one another, for receiving the elongate object, as is also the case in the above-mentioned EP document by the American Telephone and Telegraph Company.

According to the disclosure, however, it is now provided that the hole of the at least two membranes contacts the material of the frame element on the side of the slit, i.e. on the side on which the frame element can be opened up. By means of this contact between the hole and the frame element on the side of the slit, it is possible for different elongate objects having different diameters to be received very effectively, with both very good sealing and sufficient strain relief. The adaptation with regard to the different diameters of the elongate objects therefore always takes place in the region of the at least two membranes, since, when it is in the hole, the elongate object is in contact with the closed frame element on the other side. The frame element thus reliably delimits its position on one side, such that the majority of the difference in diameter can be received by the at least two membranes with regard to the sealing and the strain relief. Furthermore, this structure provides the advantage that the spatial size of the surface area of the membrane is at a maximum in the predetermined structure in this case, since, by means of the hole and the elongate object that is received later contacting the hole on the frame element on one side, the entirety of the free space within the frame element on the other side is filled by the membranes, which then have a relatively large surface area. This contributes to the advantageous mode of action of the structure.

In this case, the grommet can be provided in one pair of holes for one elongate object or in one pair of holes for each of a plurality of elongate objects. The membranes comprising the holes would then have a slit for each of the pairs of holes, such that, for example, a pair having a hole with a slit to the right and a pair having a hole with a slit to the left would be provided, as in the prior art. In order to receive four elongate objects, this would then be two pairs of holes arranged one above the other that are each open to the right via the slit and two pairs of holes arranged one above the other that are each open to the left via the slit. It would of course also be conceivable for the slits to not only extend to the right and left, but also to extend upwards and downwards.

As already mentioned, the frame element and the membrane can be formed in multiple parts, i.e., for example, a frame element made of relatively inflexible plastics material which can be opened up via a film hinge or the like and on which the membranes, for example two membranes, can be injection-moulded onto the respective side surfaces in the longitudinal direction of the elongate object to be received. According to an advantageous development of the concept, the frame element and the membranes can also be made of the same material, however. This is very simple and efficient in terms of production. The different properties with regard to the elasticity of the membranes on one hand and of the frame element on the other hand, which should still be elastic, but not as soft as the membranes, can then be easily achieved by different wall thicknesses of the material in the longitudinal direction of the elongate object to be received. In this structure, it is also conceivable for the membranes and the frame element to be formed in one piece. However, this does not have to be the case. The frame element and the membranes may for example also be divided centrally in the longitudinal direction of the elongate object to be received, such that each sub-element comprises one of the membranes, for example. If the sub-elements are then interconnected, for example welded or bonded to one another, this results in the grommet according to the disclosure having the advantageous properties as described at the outset.

According to a very advantageous development of the concept, exactly two membranes can be provided in each case. Such a structure comprising two membranes is enough for sufficient sealing and strain relief in the construction used, in which the relevant hole of the membrane contacts the material of the frame element on the side of the slit. The use of two membranes in the longitudinal direction of the elongate object to be received and thus of a space between these membranes allows for a structure of the grommet that is compact in the longitudinal direction of the elongate object to be received, such that said grommet can accordingly be configured to save space.

A particularly favourable development of the grommet according to the disclosure further provides that the frame element comprises a recess in the region of the contact with the holes. As a result, the hole and therefore the elongate object to be received in the holes is moved further in the direction of the frame element, which further increases the size of the membranes and therefore allows for high flexibility when sealing different diameters. The material of the membranes can thus yield in an ideal manner and can adapt very effectively to elongate objects of different diameters in a sealing and strain-relieving manner.

According to a very favourable configuration, the relevant hole contacts the frame element in the region of each cross section perpendicularly to the longitudinal direction of the elongate object to be received at the point at which the ends of the slit facing the hole are positioned. The hole thus contacts the slit at only one point. The holes and the frame element thus do not overlap in the region of the slit, irrespective of their extension in the longitudinal direction. In particular, in a slit extending linearly in the longitudinal direction, it may then be preferred for the holes to contact the frame element in the region of the slit along a line perpendicularly to a tangent to the contact point between the hole and the compressed and thus largely linear slit. Such contact is ideal, since the elongate object only contacts the frame element along such a line, in particular a straight line, and this ultimately allows for minimal contact with the frame element and contact over the majority of the circumference of the elongate object with the membrane. This further facilitates good sealing and strain relief.

Since the inserted elongate objects, for example cables, pipes, tubes or the like, typically have a round cross section, according to a very advantageous development of the concept, it may be provided that the recess in the frame element is arc-shaped when viewed in cross section. An arc-shaped recess of this kind makes it possible for the elongate object to also contact the frame, and this advantageously allows for cables to be prevented from getting caught and also for the sealing and strain relief to be optimised.

According to another very advantageous configuration of the concept, it may be provided that the arc has a greater diameter than the hole. When an elongate object having a relatively small diameter is received, this structure makes it possible, despite the arc-shaped recess, for said object to tangentially contact the material of the frame element, in particular along a straight slit, and nevertheless a relatively large surface area of the membrane is made possible by the recess. With an increasingly large diameter, the contact of the elongate object then increasingly approaches direct contact with the frame, with minimal parts of the membrane remaining above and below the tangential contact region in order to also securely and reliably receive and seal different diameters in this region.

According to an extremely favourable configuration of the grommet according to the disclosure, it is then provided that at least one of the membranes, preferably all of the membranes, comprise zones having different levels of elasticity. Such a structure of the membrane or membranes comprising zones having different levels of elasticity allows the membrane to be ideally adapted to its purpose during construction. By means of the zones having different levels of elasticity, the regions which typically undergo greater deformation are accordingly designed to be more elastic in order to ensure very good sealing here. At the same time, regions which undergo somewhat lower deformation can be designed to have lower elasticity in order to improve the strain relief at this point.

With regard to the production of the membrane, it is in principle conceivable for it to be implemented with a different structure and different materials of the membrane. According to an extremely favourable and advantageous development of the concept, however, it may be provided that the zones having different levels of elasticity have a different thickness of the membrane. This makes it possible to construct at least the membrane from a single material in a simple and efficient manner. The differing levels of elasticity can be achieved in a simple manner by a different thickness of the membrane during production, for example during an injection-moulding process or the like. This also allows for complex shapes for the individual zones having different levels of elasticity, which can be produced very simply in this way.

According to a very advantageous development of the concept, it may be provided that the zones have straight boundaries starting from the hole relative to one another. These straight boundaries are particularly simple and efficient to produce, in particular also when producing corresponding shapes, in order to produce the membranes or the grommet in an injection-moulding process, for example.

A very advantageous development of this concept provides that the extensions of the boundaries between the zones intersect at the point of contact of the hole with the frame element. The straight boundaries of the zones are thus produced starting from this point. This results in a structure in which different zones prevail over the circumference of each of the holes, such that not only the membrane as a whole, but in particular also the part of the membrane that directly contacts the elongate object received in the hole, have different levels of elasticity. As an alternative to a straight configuration of this kind, the use of curved boundaries or boundaries extending in any other way between the individual zones is of course also conceivable in principle.

In practice, it has been found that three zones having different levels of elasticity are ideal as a good compromise in terms of production complexity on one hand and functionality on the other hand. According to a very advantageous development of the grommet according to the disclosure comprising the zones having different levels of elasticity, it is accordingly provided that three zones having different levels of elasticity are provided, the central zone arranged between the other zones transversely to the longitudinal direction of the elongate object to be received having a higher level of elasticity than the two adjacent zones. If the frame element itself were considered to be another zone, this would be a zone having a yet lower level of elasticity than the zones within the membrane, just for the sake of completeness. The above-described structure with the zone having the highest level of elasticity in the centre allows for ideal yielding in this region, with simultaneous firm "gripping" of the adjacent zones at the circumference of the elongate object. This ensures both good sealing and good strain relief.

A very favourable development of the grommet according to the disclosure can then further provide that the two or the two outer membranes are arranged so as to be offset inwards relative to the outer boundary of the grommet in the longitudinal direction of the elongate object to be received. According to the disclosure, the grommet can thus be formed in the manner of a cuboid, a cube or a cylinder or the like. The advantageous development described here offsets the structure of the membranes relative to the outer surfaces of a cube or cuboid of this kind such that, for example, the two membranes, or if more membranes are provided, the two outer membranes, are therefore arranged so as to be offset inwards relative to the outer surface of the cuboid. If the grommet is, for example, received in a cable bushing such as the frame described in the German patent by the applicant mentioned at the outset or the like, or in a housing, it is often the case that the grommets interact with the housing or the frame in a form-fitting manner, and specifically typically in the central region in the longitudinal direction of the elongate object to be received, such that greater forces can act on a membrane that is set back relative to the surface that is on the outside in the longitudinal direction than on a membrane that is arranged directly on the outer surface. Depending on the total number of membranes, the membranes or outer membranes that are set back relative to the outer surface thus have the advantage that greater forces are possible for compressing the membranes and therefore ultimately greater forces are possible for the sealing and strain relief.

In this case, the slit in the frame element can in principle be formed in any way. Both linearly extending slits and slits extending in an undulating shape are therefore known from the two documents mentioned at the outset. According to a particularly favourable development of the concept, however, it may be provided that the slit comprises at least one, in particular trapezoidal, step in the longitudinal direction of the elongate object to be received. This allows the surfaces concerned which form the slit to engage with one another in an effective manner. This is particularly applicable to a combination with curved or linear portions of the slit, preferably with linear portions of the slit in the region of the membranes/holes.

According to an advantageous development, this can be yet further improved in that the parts of the frame element in the region of the slit comprise at least one guide element on one part and at least one corresponding opening on the other part. This improves the precise positioning of the parts relative to one another. The guide element is in particular formed in one piece with the frame element.

Alternatively or in particular additionally, another development provides that the slit comprises at least one step transversely to the longitudinal direction of the elongate object to be received. Although this lengthens the surface to be sealed, it can help improve the positioning of the parts of the frame element relative to one another, similarly to the guide elements.

BRIEF DESCRIPTION OF THE DRAWINGS

Further advantageous configurations of the grommet according to the disclosure are also found in the embodiments which are described in greater detail in the following with reference to the drawings, in which.

DETAILED DESCRIPTION

Figure 1:
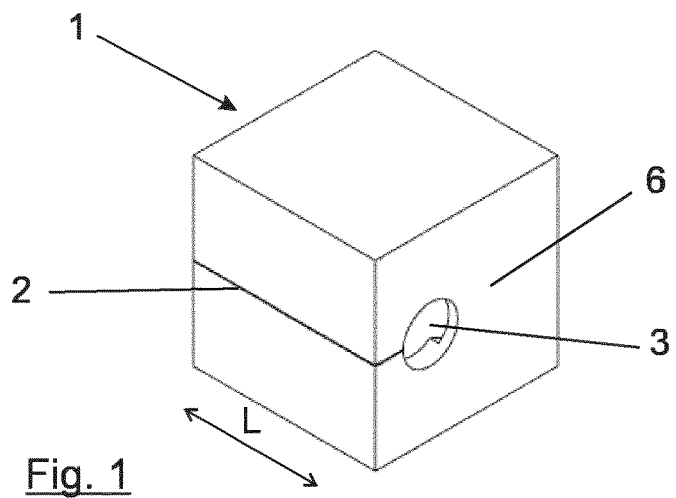
FIG. 1 is a three-dimensional view of a possible embodiment of a grommet according to the disclosure.

The view in FIG. 1 is a schematic perspective view of a grommet 1 in a possible embodiment according to the disclosure. In the embodiment shown here, the grommet 1 is intended to be formed in one piece and made of a single material, for example an elastic polymer. In a manner known per se, the grommet 1 can be opened up via a slit 2 in order to receive an elongate object, such as a cable 5, which is shown in the view in FIG. 4. By connecting the hole 3 to the slit 2, a prefabricated cable 5, i.e. a cable that already comprises a plug connector or the like, for example, can be inserted into the grommet 1 without difficulty since it is not threaded through the hole 3, but instead can be inserted from the side by opening up said grommet along the slit 1. The grommet is then closed over the elongate object or the cable 5 again and is pressed into corresponding receptacles in a housing, a frame or the like, for example, in order to securely retain the cable 5, i.e. to ensure strain relief in the longitudinal direction L and to seal the passage of the cable through the hole 3 or the grommet 1.

Figure 2:
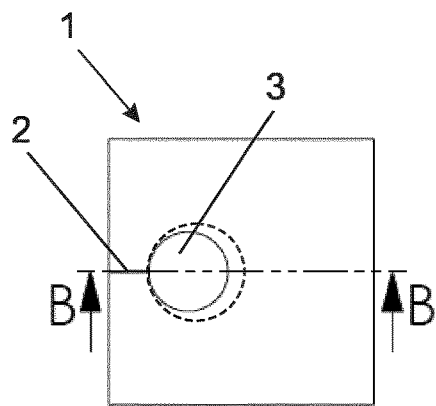
FIG. 2 is a side view of the grommet viewed in the longitudinal direction of the elongate object to be received.

FIG. 2 shows that the hole 3 has a first diameter. A second diameter is indicated by a dashed line. The structure is then produced such that elongate objects, in particular cables 5, having different diameters, in particular having diameters between the diameter range of the hole 3 or a slightly greater diameter on one hand and the diameter indicated here by a dashed line on the other hand, can be received securely and reliably in the grommet 1 in a strain-relieving and sealing manner.

Figure 3:
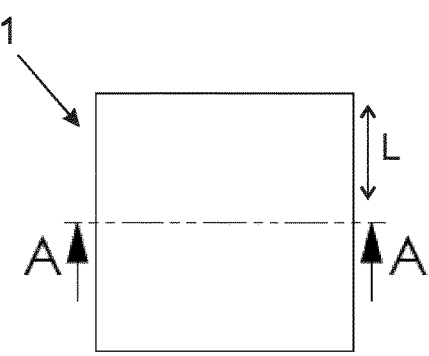
FIG. 3 is a plan view of the grommet.

The view in FIG. 3 is a plan view of the grommet 1, primarily to show the position of subsequent sectional views by means of the line A-A. Accordingly, a line B-B is shown in FIG. 2.

Figure 4:
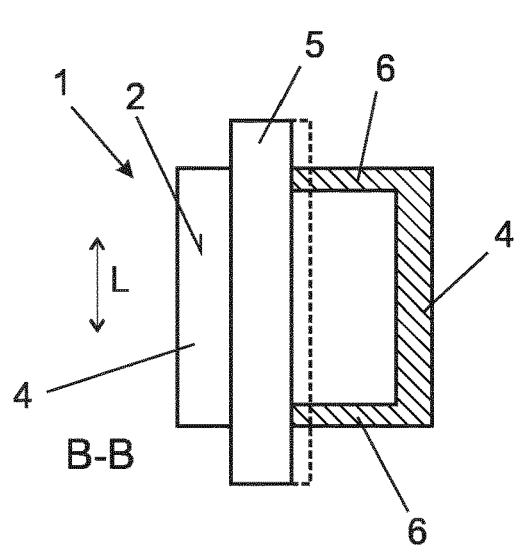
FIG. 4 is a section through a first possible embodiment of the grommet along line B-B in FIG. 2.

The view in FIG. 4 shows that, in a section along line B-B from FIG. 2, the structure of the grommet 1 is such that it comprises a frame element 4 on one side, of which the side shown on the right in FIG. 4 is shown in section and the side shown on the left in FIG. 4 can be seen along the slit 2. In the longitudinal direction L of the cable or elongate object shown here and denoted by reference sign 5, two membranes 6 which have a higher elasticity per se than the frame element 4 are spaced apart from one another, for example in a one-piece structure or a structure using the same material for the frame element 4 and the membranes 6 and different material thicknesses, in particular in the longitudinal direction L of the cable 5 to be received. The cable 5 can then be received in the grommet 1 by the two membranes 6. In this case, cables 5 having different diameters can also be received without difficulty. Similarly to the view in FIG. 2, a cable 5 having a slightly greater diameter than the hole 3 is shown here. A thicker cable 5 which can likewise still be received in the grommet 1 in a sealing and strain-relieving manner is also shown by a dashed line. In this case, depending on the size of the grommet 1, the range is a few millimetres, for example in a grommet 1 having a width and/or height transversely to the longitudinal direction L in the order of from 15 to 25 mm. In accordingly larger grommets, greater differences between the minimum diameter of the cable 5 that is to be received and the maximum diameter that can be received are also conceivable.

Figure 5:
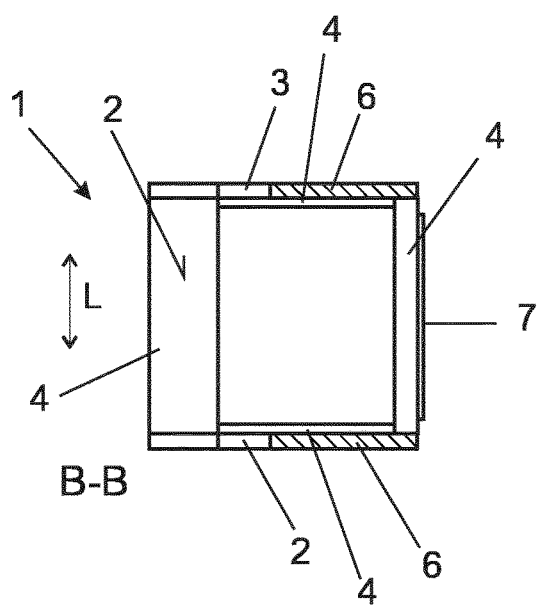
FIG. 5 is a section through another possible embodiment of the grommet along line B-B in FIG. 2.

An alternative embodiment, which has already been indicated at the outset of the description, is found in the view in FIG. 5. Unlike the previous attachment parts, in this case the frame element 4 is for example made of a harder plastics material, in particular a fibre-reinforced plastics material. The frame element, which is then constructed in two pieces, can accordingly be opened up on one side by means of the slit 2 via a film hinge 7. When closed, a membrane 6 is then attached to, for example injection-moulded onto, both the top and the bottom in the view in FIG. 5. Comparably to the above information, the elastic membrane 6 then provides the described functionality and also allows the frame element 4 to be opened up via the film hinge to a certain extent, which is sufficient to insert prefabricated cables into the holes 3 via the slit 2.

Figure 6:
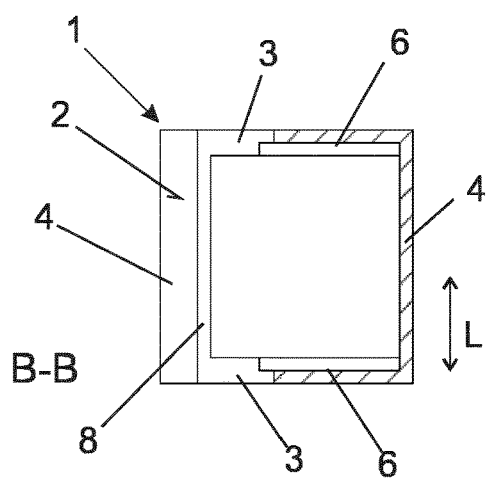
FIG. 6 is a section through a third possible embodiment of the grommet along line B-B in FIG. 2.

The view in FIG. 6 is another section along line B-B from FIG. 2. In this variant, it can be seen that the membrane 6 in FIG. 7, which is a section along line A-A in FIG. 3 having the same structure, has different wall thicknesses, which will be discussed further in the following. It can also be seen that the frame element 4 and the hole 3 are formed such that a recess 8 is produced in the frame element 4 by the hole 3 on the left-hand side in the view in FIG. 6. The hole therefore not only contacts the frame element 4, as shown in the views in FIGS. 2, 4 and 5, but also projects slightly into the frame element 4. The recess 8 thus both allows for an ultimately larger surface area of the membranes 6 and allows for very good contact between the elongate object or cable 5 to be received and the frame element 4 in the region of the slit 2.

Figure 7:
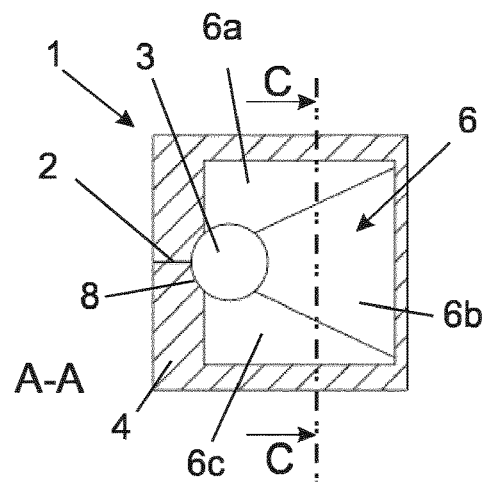
FIG. 7 is a section through the embodiment of the grommet according to FIG. 6 along line A-A in FIG. 3.
Figure 8:
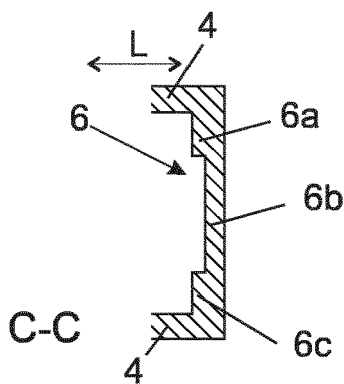
FIG. 8 is a section through a detail of the grommet and its membrane along line C-C in FIG. 7.

The different thicknesses of the material of the membranes 6, which have already been discussed, can now be explained in greater detail, in particular on the basis of the views in FIGS. 7 and 8. The section along line A-A in FIG. 2 in the view in FIG. 7 shows the hole 3 in the membrane 6 and in the recess 8 in the frame element 4. In addition, the membrane 6 itself is divided into three different zones 6a, 6b and 6c. In this embodiment, the boundaries between these zones 6a, 6b, 6c of the membrane 6 extend in a straight line and, if they were extended into the hole 3, would intersect at the point of contact of the hole 3 with the slot 2. The individual zones 6a, 6b, 6c then have different levels of elasticity. This can be achieved in an ideal manner, for example in terms of production, by the material of the membrane 6 having a different material thickness in the region of the individual zones 6a, 6b, 6c. This can be seen in the view in FIG. 8, which is a section through a detail of the grommet 1 along line C-C in FIG. 7. The zones 6a and 6c of the membrane 6 arranged at the top and the bottom in the view in FIGS. 7 and 8 are accordingly designed to be thicker and therefore less elastic than the central zone 6b of the membrane 6 arranged therebetween. As a result, in the region of the zones 6a, 6c having average elasticity, sufficient deformation can be achieved for sealing different diameters of the cables 5 or elongate objects. The zone 6b of the membrane 6 provided with greater elasticity therefore allows for sufficient deformation of the membrane 6 in order to make it possible to provide reliable contact and sealing over the entire circumference of the cable 5. The slightly more rigid zones 6a, 6c in the immediate vicinity of the part of the frame element 4 with which the hole 3 is in contact allow for sufficient strain relief.

Figure 9:
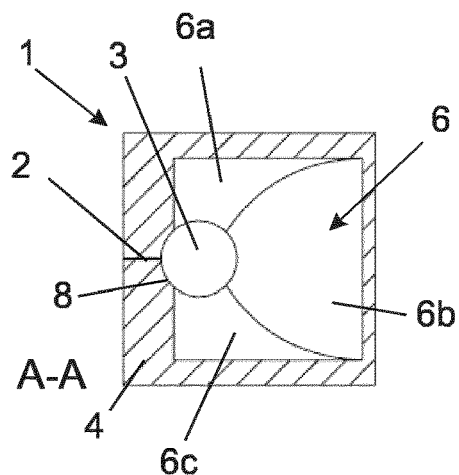
FIG. 9 is a section through another embodiment of the grommet according to the disclosure along line A-A in FIG. 3.

The view in FIG. 9 is an alternative to the view in FIG. 7, which, in the section along the line B-B in FIG. 2, would look the same as the view in FIG. 6. The only difference is that the boundaries between the zones 6a, 6b, 6c are not designed to be straight, but instead are designed to be curved in this example. It is advantageous here for the curved boundaries between the zones 6a, 6b, 6c to be designed such that the different levels of elasticity of the individual zones 6a, 6b, 6c and of the part of the frame element 4 in the region of the recess 2 are in contact over the circumference of the hole 3. Nevertheless, the surface area of the zone 6b can be increased, in particular without altering the division of the zones 6a, 6b, 6c over the circumference of the hole 3. The extension of the boundaries, which starts radially from the hole 3, also makes it possible to very clearly delimit the zones 6a, 6b, 6c or their levels of elasticity into the respective portions of the circumference of the hole 3.

Figure 10:
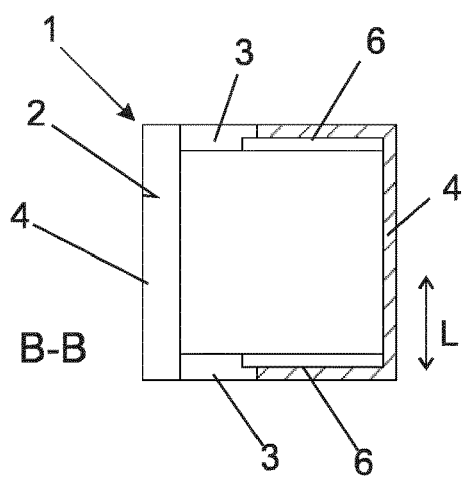
FIG. 10 is a section through another embodiment of the grommet according to the disclosure along line B-B in FIG. 2.
Figure 11:
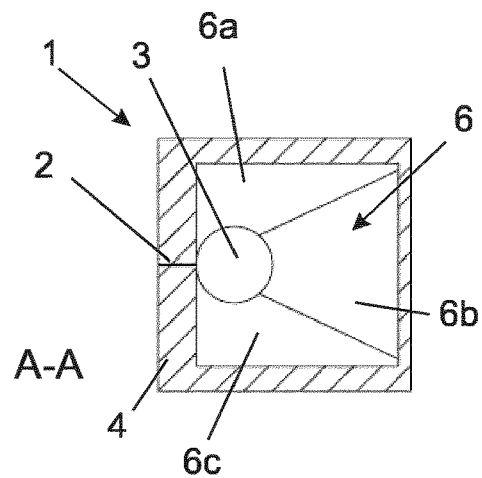
FIG. 11 is a section through the embodiment of the grommet according to FIG. 10 along line A-A in FIG. 3.

Another variant, again with the sections along lines B-B and A-A according to FIGS. 2 and 3, is shown in FIGS. 10 and 11. The difference is essentially that the recess 8 has been omitted. The hole 3 thus contacts the frame element 4 in a tangential manner in the region of the slit 2 without it comprising the above-described recess 8. The boundaries extend between the individual zones 6a, 6b, 6c, as can be seen from the view in FIG. 11, again such that they accordingly intersect within the hole 3 in their extension at the point of intersection of the hole 3 with the slit 2. They are designed to be straight lines, in a comparable manner to the view in FIG. 7. However, they could also be designed according to the configuration in FIG. 9, i.e. with curved boundaries.

Figure 12:
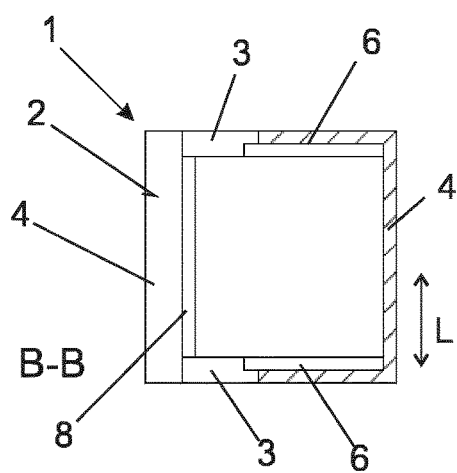
FIG. 12 is a section through another alternative embodiment of the grommet along line B-B in FIG. 2.

Another variant of the grommet 1 can be seen in the views in FIGS. 12 and 13, again in a sectional view along lines A-A and B-B. In the case shown here, the recess 8 is present again. Unlike in the views in FIGS. 6, 7 and 9, in this case the recess 8 is not designed to have the diameter of the hole, i.e. approximately the smallest diameter of an elongate object or cable 5 to be reliably received, but instead is designed to have a greater diameter. The arc-shaped recess 8 thus makes it possible to further improve the sealing, in particular for cables 5 or elongate objects having a considerably greater diameter than the diameter of the hole 3. In this case, for proper sealing in the variant in FIGS. 6, 7 and 9, the material of the frame element 4 has to deform minimally at the same time, which means that an elastic frame element 4 is required. Owing to the recess in the variant in FIGS. 12 and 13, which is still arc-shaped but has a greater diameter, this no longer has to be the case. In the embodiment in FIGS. 12 and 13, the diameter of the arc-shaped recess 8 may for example be designed to have the greatest diameter of the elongate object 5 to be received, such that said object can use a minimal remainder of the membrane 6 between the tangential contact points of the hole 3 and the frame element 4 in the region of the slit 2 at smaller diameters in order to improve the sealing and can accordingly displace said remainder of said membrane at the greatest diameters to be received. If the diameter of the arc-shaped recess 8 in the variant in FIGS. 12 and 13 is further enlarged, very good sealing is still possible even for inserted elongate objects or cables 5 that may be above the permissible maximum diameter.

Figure 13:
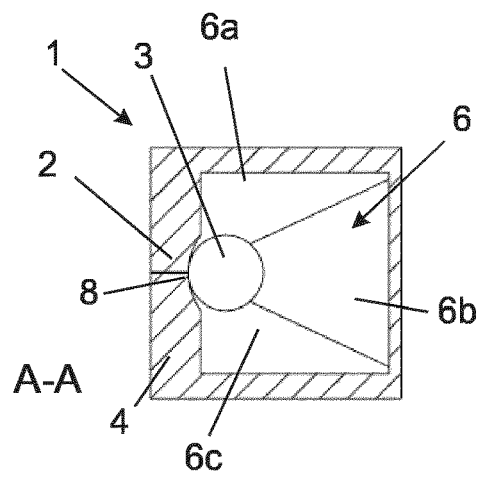
FIG. 13 is a section through the embodiment of the grommet according to FIG. 12 along line A-A in FIG. 3.

As can be seen from the view in FIG. 13, in this case, the structure of the membranes 6 again has the three zones 6a, 6b, 6c having different levels of elasticity in the structure having a straight-line boundary. Here too, a curved boundary, similar to the view in FIG. 9, or a boundary of another shape having an undulating or similar extension, for example, would of course also be conceivable in principle. The individual aspects of the variants can therefore be combined with one another according to all the above-described figures.

Figure 14:
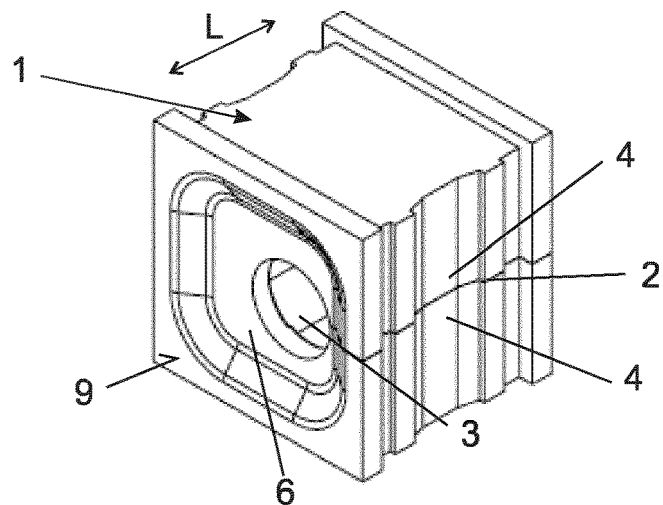
FIG. 14 is a three-dimensional view of an alternative embodiment of the grommet.

The view in FIG. 14 is such that the grommet 1 is shown in a generally standard, common shape, which is designed to be received in a frame, a contact cavity in a housing, or the like, on two of its sides transversely to the longitudinal direction L. The upper face is constructed to be flat here, for example in order for it to be possible to be pressed together with another grommet 1. The lower face may be designed to be flat or to have the same profile as the side edges. Compared with the variant schematically shown in FIG. 1, the membrane 6 having the hole 3 is set back in the longitudinal direction L relative to an outer surface or outer face 9 of the grommet 1 on its relevant side, such that the cable 5 is compressed between the two membranes 6 in a region in which the grommet 1 is also accordingly compressed by the material of the housing of the frame or the apparatus receiving it in order to provide yet more reliable sealing.

Figure 15:
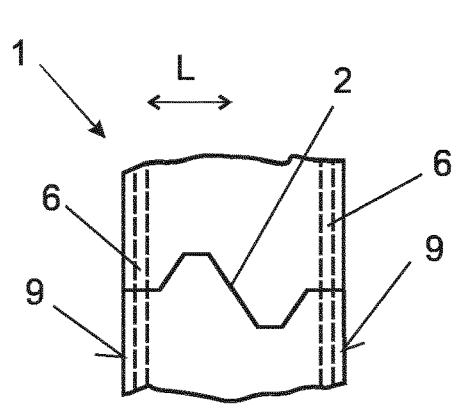
FIG. 15 shows a possible embodiment of the slit in a variant of the grommet.

The view in FIG. 15 shows a detail of a grommet 1 with a possible extension of the slit 2 in the longitudinal direction L. In this case, the slit 2 starts with a straight portion in the region of the membrane 6 shown on the right, which is only indicated by dashed lines within the grommet 1, and then extends upwards in a first trapezoidal step, so as to transition directly into a second trapezoidal step extending downwards, and so as to end with a straight portion again in the region of the other membrane 6. A straight portion between the two trapezoidal steps would of course also be conceivable, and it would likewise be conceivable for the trapezium to be directly connected to the outer faces 9 of the grommet 1, such that the straight part is thus completely omitted or is only present between the two trapezoidal steps. Other types of step are of course also conceivable, such as rectangular steps or a larger number of steps. However, the trapezium provides the advantage that the parts can easily engage with one another.

In principle, only an upward trapezoidal step in an otherwise straight configuration of the slit 2 in the longitudinal direction L is also possible. The variant may be accordingly combined with all of the above-described variants in this case.

Figure 16:
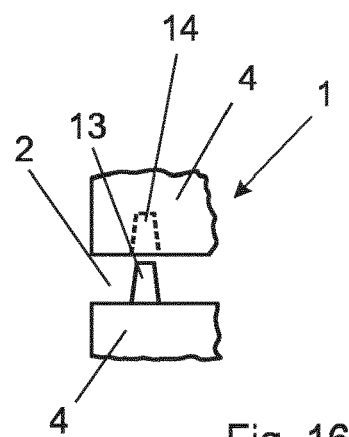
FIG. 16 shows a possible detail of the slit which can be implemented for different shapes of the slit.

The view in FIG. 16 additionally shows a detail of the slit 2 in the grommet 1 with frame elements 4 shown so as to spaced apart. For example, it comprises a truncated-cone-shaped guide element 13 in a straight portion, in this case on the lower surface, which element can penetrate a corresponding opening 14 on the part of the frame element 4 forming the opposite side of the slit 2 when the two surfaces of the frame elements 4 come to rest against one another in order to close the slit 2. A guide element 13 of this kind comprising a corresponding opening 14 can be combined with different shapes of the slit 2. It is particularly suitable for a portion in which the slit 2 extends so as to be straight. Multiple guide elements may be distributed over the surface of the slit 2 in order to ensure good positioning of the parts of the frame element 4 relative to one another when pressing the grommet 1 together and therefore to further improve the sealing of the slit 2. Of course, it may be provided here that each of the frame parts 4 comprises both guide elements 13 and openings 14, the respective guide elements 13 of one part of the frame element 4 penetrating the respectively corresponding recesses 14 in the other part.

Figure 17:
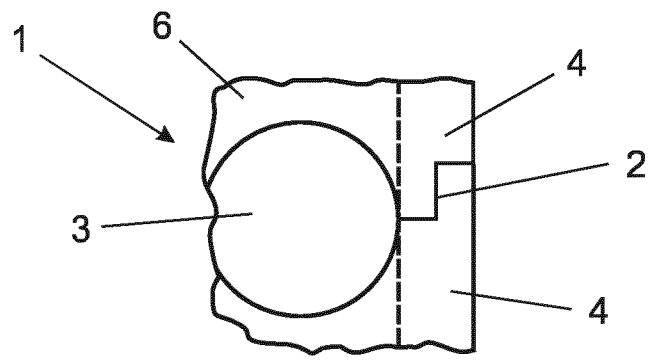
FIG. 17 shows another possible variant of the slit, which can be combined with the other variants.
Figure 18:
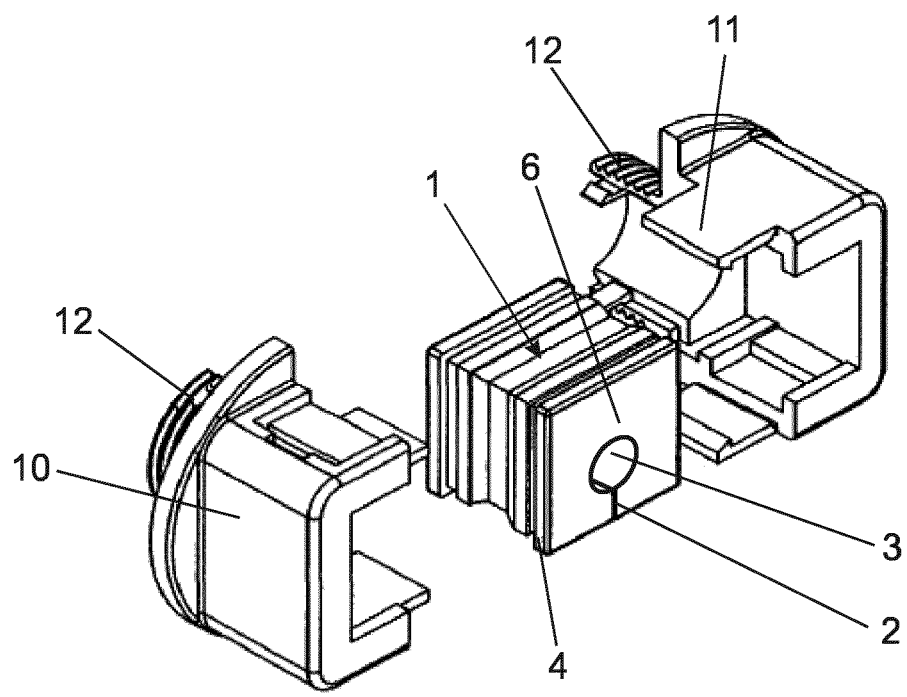
FIG. 18 shows an exemplary application of the grommets according to the disclosure.

Another general option for designing the slit 2, which can also be combined with the above-described variants, is shown in FIG. 17. In this case, the viewing direction is along the elongate object to be inserted, i.e. in the longitudinal direction L, towards the grommet 1, or the detail thereof that is shown. In this case, the slit 2 extends starting from a contact point in each cross-sectional surface transversely to the longitudinal direction L from the hole 3, with a step towards the outside. A plurality of steps, or a configuration in the manner of a tongue and groove, i.e. a step that goes upwards and then downwards again, are likewise conceivable here. This lateral division of the frame elements 4 in the region of the slit 2 may likewise serve to provide improved positioning of the frame parts 4 relative to one another and therefore ultimately to improve the sealing.

In this case, as is known from the prior art, the grommets 1 may be provided and used in different sizes and dimensions, both in terms of the external dimensions and also in terms of the holes 3. They may for example be used in frames such as those known from the German patent specification by the applicant as mentioned at the outset. In the view in FIG. 15, another possible intended purpose is shown on the basis of an exploded view. In this case, the grommet 1 comprising the slit 2 and the hole 3 is received between two halves 10, 11 of a cable bushing, which can be clipped around the grommet 1. The cable bushing can then be inserted into a round hole in a switch cabinet or the like and can be fixed therein, by means of a nut, to a thread 12, which is formed once the two halves are joined together and clipped to one another. This is also widely known from the prior art and therefore merely amounts to one of many conceivable and known options for using grommets of this kind, in this case a grommet 1 having the claimed arrangement of the membranes 6 and the hole 3.

In addition to the described use with a plurality of different types of frame, such as a frame comprising the halves 10 and 11 in this case, the grommets 1 may of course also be used without such frames in which they are received. For example, the grommets 1 could have a round cross section on the outside and comprise a groove in order to thus be inserted into a round hole in a sheet-metal wall, for example a switch cabinet or the like. It is also possible to insert said grommets into suitable cut-outs in a housing for introducing cables into the housing, for example.

The invention claimed is:

1. Grommet made of a material that is elastic at least in portions for receiving at least one elongate object for strain relief and sealing, comprising an outer frame element that can be opened along a slit and comprises at least two membranes that are spaced apart in the longitudinal direction of the elongate object to be received and each comprise a hole of equal size, so as to be flush with one another, for receiving an elongate object, wherein the respective hole of the at least two membranes contacts the material of the frame element on the side of the slit, wherein at least one of the membranes comprises a plurality of zones having different levels of elasticity, wherein the plurality of zones having different levels of elasticity comprise three zones having different levels of elasticity, the three zones including a central zone arranged between the two other zones transversely to the longitudinal direction of the elongate object to be received, the central zone having a higher level of elasticity than the two adjacent zones, the central zone and the other two zones terminating at the hole of the at least one of the membranes.

2. Grommet according to claim 1, wherein the frame element and the membrane are made of the same material.

3. Grommet according to claim 1, wherein exactly two membranes are provided.

4. Grommet according to claim 1, wherein the frame element comprises a recess in the region of the contact with the holes.

5. Grommet according to claim 1, wherein the hole contacts the frame element in the region of each cross section perpendicularly to the longitudinal direction of the elongate object to be received at the point at which the end of the slit facing the hole is positioned.

6. Grommet according to claim 4, wherein the recess is arc-shaped in cross section.

7. Grommet according to claim 6, wherein the arc of the recess has a greater diameter than the holes.

8. Grommet according to claim 1, wherein the zones having different levels of elasticity have a different thickness of the membrane.

9. Grommet according to claim 1, wherein the zones have straight boundaries starting from the hole relative to one another.

10. Grommet according to claim 9, wherein extensions of the boundaries between the zones intersect at the point of contact of the holes with the frame element.

11. Grommet according to claim 1, wherein the zones have curved boundaries starting from the hole.

12. Grommet according to claim 1, wherein the two or the two outer membranes are each arranged so as to be offset inwards relative to an outer boundary surface of the grommet in the longitudinal direction of the elongate object to be received.

13. Grommet according to claim 1, wherein the slit comprises at least one step in the longitudinal direction of the elongate object to be received.

14. Grommet according to claim 1, wherein the parts of the frame element in the region of the slit comprise at least one guide element on one part and at least one corresponding opening on the other part.

15. Grommet according to claim 1, wherein the slit comprises at least one step transversely to the longitudinal direction of the elongate object to be received.

16. Grommet according to claim 2, wherein the frame element and the membrane are made of the same material.

17. Grommet according to claim 2, wherein the frame element comprises a recess in the region of the contact with the holes.

18. Grommet according to claim 3, wherein the frame element comprises a recess in the region of the contact with the holes.

19. Grommet according to claim 13, wherein the at least one step comprises a trapezoidal step.

* * * * *